March 22, 1966   D. L. PHILLIPS   3,241,218
METHOD OF FABRICATING PIN CONNECTORS
Filed Jan. 5, 1962   2 Sheets-Sheet 1

INVENTOR:
Delbert L. Phillips

By Smyth, Roston & Pavitt
Attorneys

March 22, 1966 D. L. PHILLIPS 3,241,218
METHOD OF FABRICATING PIN CONNECTORS
Filed Jan. 5, 1962 2 Sheets-Sheet 2
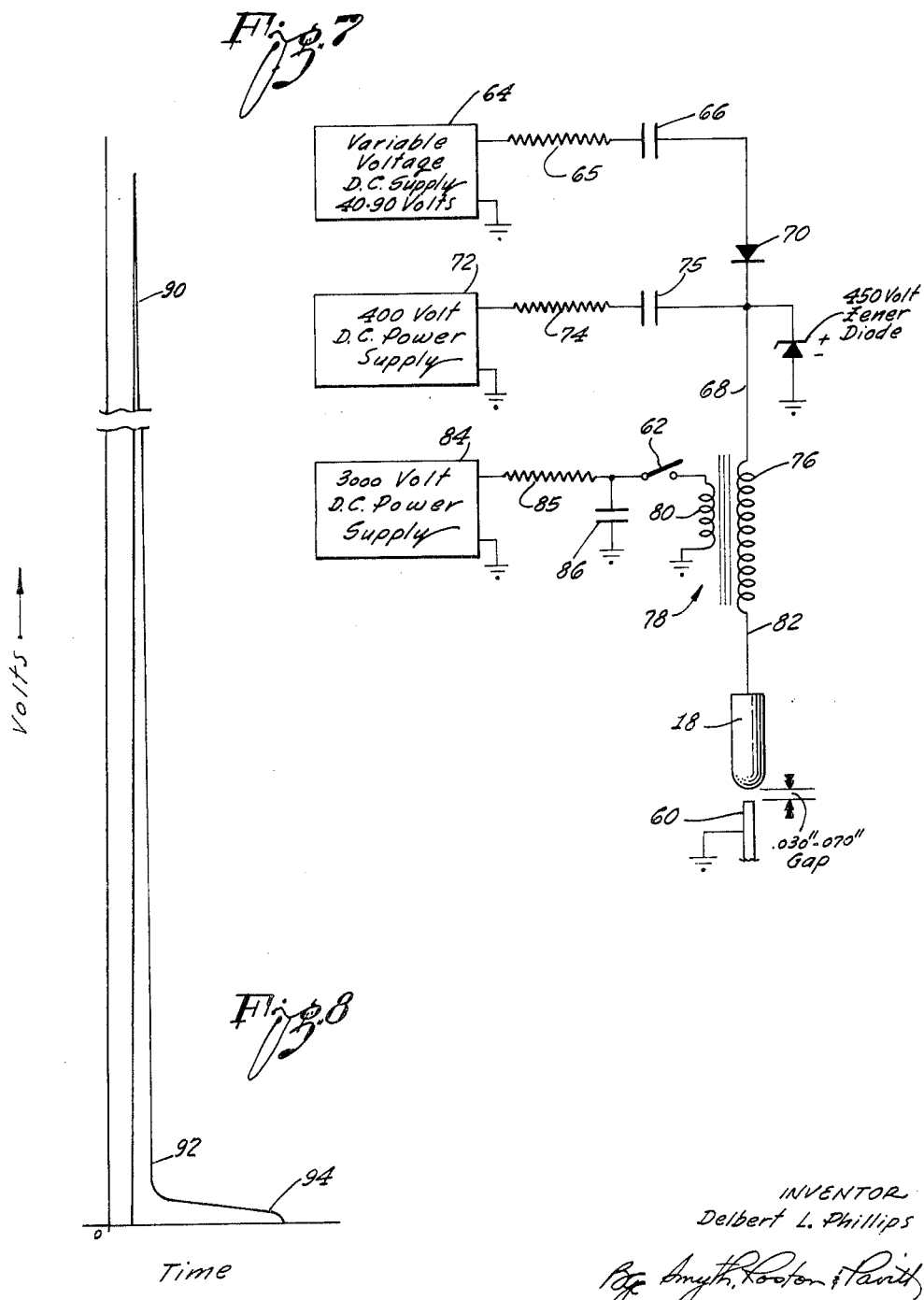
INVENTOR
Delbert L. Phillips United States Patent Office 3,241,218
Patented Mar. 22, 1966

3,241,218
METHOD OF FABRICATING PIN CONNECTORS
Delbert L. Phillips, Santa Monica, Calif., assignor to New Twist Connector Corporation, Santa Monica, Calif., a corporation of California
Filed Jan. 5, 1962, Ser. No. 164,474
8 Claims. (Cl. 29—155.55)

This invention relates to an electrical pin connector for plugging into a complementary socket connector and, more particularly, relates to a pin connector which has a ferrule portion for mounting on the end of a wire and a pin portion of smaller diameter extending axially from the ferrule portion.

The broad object of the invention is to avoid certain troublesome structural disadvantages that are inherent in conventional pin connectors of this type and to simplify the fabrication of such a pin connector with consequent reduction in production cost.

Heretofore, the dominating consideration in the fabrication of a pin connector has been the necessity of forming a rounded nose on the end of the pin. Since it has been necessary to form the rounded nose by a machining operation, it has been necessary to use pin material of acceptable machining properties. Since it has been necessary to go to the expense of setting up the blank pin material for the machining of the rounded nose, the need for minimizing further cost has led to the practice of machining the whole pin. It is for these reasons that an estimated ninety percent of the pin connectors produced annually are machined.

A number of serious disadvantages are inherent in machined pin connectors. In the first place, the metal must be relatively hard for machining, whereas a pin is less liable to be broken if it is made of copper or other relatively soft and pliable metal of high conductivity. Copper can be modified by additives, such as tellurium or lead, to give it machining properties, but such additives undesirably reduce the conductivity of the pin.

In the second place, the machining of a pin connector makes it susceptible to fracture. Stresses concentrate wherever any kind of circumferential shoulder is formed on a machined pin, and even if the pin is of uniform diameter, the machining operation forms circumferential grooves with stress concentration at the grooves. The circumferential grooves may be made exceedingly small but cannot be completely avoided, and the circumferential grooves tend to start fractures in the same manner that circumferential scratches tend to start fractures. In addition to creating stress concentrations by grooving, the surface metal is subjected to compression and tearing by the machining tool.

In the third place, it is too costly in the mass production of pin connectors to machine the pins to closely controlled diameters. Consequently, the pins are machined with liberal tolerances and, accordingly, vary widely in dimension.

The present invention avoids all of these disadvantages by avoiding the necessity of forming the rounded nose of a pin by a machining operation. The invention is based on the discovery that a rounded nose may be formed by the properly controlled and localized application of heat for momentarily melting the tip of a pin.

Certain requirements must be met in the use of heat for this purpose. The metal must be brought to a sufficiently molten state to permit the change to rounded configuration to be accomplished by the surface tension of the molten metal but only a restricted tip portion of the pin must be raised above the melting point. The application of excessive heat must be avoided and the heating period must be exceedingly brief.

It has been further discovered that these requirements may be met for mass production by using an appropriately controlled electric arc. For this purpose, a blank pin is placed in a circuit with a suitable electrode and the circuit is energized momentarily with current which has a component of sufficiently high frequency to cause an arc to be struck across the gap between the blank pin and the electrode without the necessity of first bringing the electrode into contact with the blank pin. The duration of the arc as well as the amount of arc energy may be conveniently and accurately controlled by discharging capacitor means in the circuit to produce an output pulse of current. Anyone skilled in the art can quickly arrive at the adjustments required in such a circuit for forming uniformly satisfactory rounded noses on an infinite number of successive identical blank pins.

Since the use of an electric arc eliminates the necessity of setting up a blank pin for a machining operation, it removes the economic necessity of machining the whole pin. The pin may be simply a severed piece of drawn wire with an arc-treated nose.

With machinability no longer a consideration, the pin may be made of hard drawn copper which is ideal for the purpose of a connector not only because of its high conductivity but also because of its pliability. Any minute scoring of a drawn wire runs longitudinally of the wire and, therefore, creates no tendency for the drawn wire to break. A hard drawn copper wire may be bent to a sharp 90° turn and then restored to shape with no serious effect on its structure. A machined pin would ordinarily be damaged beyond use by the same treatment. Fortuitously, liberal dimension tolerances are no longer necessary because copper wire may be drawn with exceedingly close accuracy by using diamond dies.

All of these advantages are achieved with actual reduction in the cost of production. A wire drawing operation to produce a pin is much less expensive than a machining operation and eliminates the need of setting up a blank pin for a machining operation. Further economy is achieved by plating the wire before severing it into pin lengths instead of plating individual pins. Still further economies are attainable because the new fabrication procedure lends itself to full automation with comparatively simple equipment requirements.

The various features and advantages of the invention may be understood from the following description and the accompanying drawings.

In the drawings, which are to be regarded as merely illustrative:

FIG. 7 is a wiring diagram of an apparatus for producing a pulse of current with a high frequency component to create an arc for forming the rounded nose; and FIG. 8 is a graph of a pulse of current produced by the apparatus of FIG. 7.

The preferred sequence of steps for fabricating the connector pin comprises the following steps:

(1) Ferrules are formed by impact extrusion.

(2) The ferrules are batch plated with a suitable metal such as gold, silver, platinum or palladium.

(3) A wire of the required diameter is drawn from copper, the result being a hard drawn copper wire.

(4) The long wire is batch plated with a suitable metal such as gold, silver, platinum or palladium.

(5) The wire is cut into short lengths to be used for blank pins.

(6) Blank pins are assembled to the ferrules by crimping the ferrules onto the blank pins.

(7) An arc is applied to the leading end of each assembled blank pin to form the required rounded nose.

It will be apparent to those skilled in the art that the order of steps in this sequence may be varied. For example, the batch plating may be carried out after the blank pin is assembled to the ferrule. It will also be apparent to those skilled in the art that other steps may be employed. For example, the ferrules may be produced by other processes than impact extrusion, and the ferrules may be attached to the blank pins in other ways than by crimping.

Figure 2:
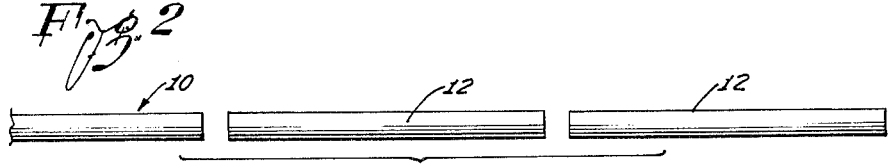
FIG. 2 illustrates the step of severing a drawn wire to produce blank pins.
Figure 3:
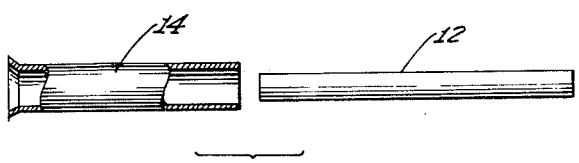
FIG. 3 is a side elevational view showing a ferrule and a blank pin positioned adjacent thereto in preparation for assembly.

FIG. 2 shows a length of hard drawn copper wire 10 which has been batch plated with a suitable metal, such as gold. The wire is severed to form blank pins 12. FIG. 3 shows a metal ferrule 14 which is preferably made of copper and shows a blank pin 12 in position to be telescoped into the end of the ferrule. The ferrule 14 may be produced by impact extrusion, as heretofore noted, or in any other satisfactory manner.

Figure 1:
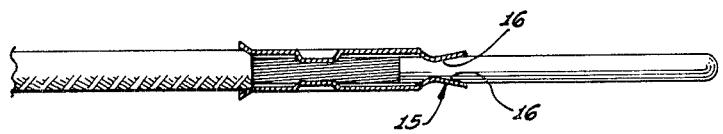
FIG. 1 is an enlarged longitudinal sectional view of the presently preferred embodiment of the invention, the view showing the completed pin connector mounted on the end of an insulated electric wire.
Figure 4:
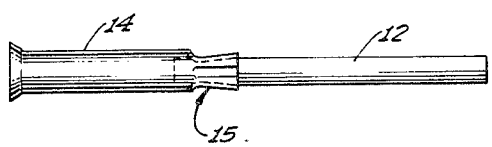
FIG. 4 is a similar view showing the assembled ferrule and blank pin with the ferrule in crimped engagement with the blank pin.

FIG. 4 shows the blank pin 12 telescoped into the end of the ferrule 14 and shows the ferrule crimped, as indicated at 15, to anchor the blank pin therein. As best shown in FIG. 1, the formation of a crimp 15 in the ferrule 14 results in the formation of a corresponding recess 16 in the pin 12, the recess being somewhat tapered with its maximum depth towards the inner end of the pin. It is apparent that the crimping effectively and positively interlocks the pin and ferrule.

Figure 5:
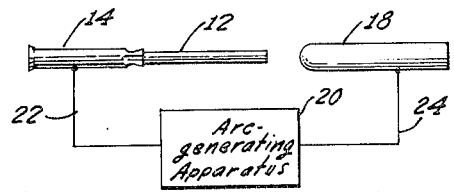
FIG. 5 is a diagrammatic view showing the ferrule and pin assembly in an electric circuit with an electrode spaced from the leading end of the blank pin.

FIG. 5 shows the assembled ferrule and blank pin connected in a circuit with an electrode 18 which may be a carbon electrode. For this purpose, the ferrule 14 is connected to one side of an arc-generating apparatus 20 by a lead 22 and the electrode 18 is connected to the other side of the circuit energizer by a lead 24.

Figure 6:
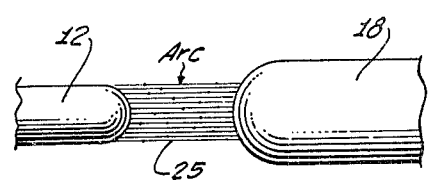
FIG. 6 is an enlarged diagrammatic view showing an electric arc forming a rounded nose on the pin.

It is well known that a pulse of current having a high frequency alternating component, for example a frequency in the radio frequency range, will cause an arc to be created across the gap between the tip of the blank pin 12 and the electrode 18. FIG. 6 shows such an arc designated by the numeral 25.

The arc 25 has an exceedingly high temperature but the application of this high temperature is confined solely to the tip of the blank pin 12. The arc melts the tip metal but the arc is extinguished before the melting effect can be extended beyond the tip portion. During the brief moment of time in which the tip portion of the pin 12 is melted, the surface tension of the molten metal causes the molten metal to assume a rounded configuration, which configuration is an ideal configuration for the nose of a pin.

A special advantage of a connector pin that is produced by the described procedure is that the nose of the pin has an exceedingly smooth surface that can be produced in no other way. In contrast to a machined nose, a nose that is produced by the surface tension of molten metal has no scoring or abrasion marks whatsoever. It may be readily appreciated that the rounded nose is much superior to a machined nose.

FIG. 7 shows the essential circuits of an apparatus that may be employed to provide a pulse of current with a high frequency component to form a rounded nose on the end of a pin connector. FIG. 7 shows the previously mentioned electrode 18 and shows an unfinished pin element 60 spaced from the electrode by a gap of a magnitude on the order of .030–.070 inch. When a switch 62 is closed a pulse of current is released to create the desired arc between the electrode 18 and the pin connector 60.

In FIG. 7 a voltage supply 64 that is adjustable in potential between 40 and 90 volts is grounded on one side and on the positive side is connected by a resistor 65 to one side of a first capacitor 66. The second side of the first capacitor 66 is connected to a conductor 68 through a diode 70 that prevents reverse flow of the current. A grounded 400 volt D.C. power supply 72 is connected through a resistor 74 to one side of a second capacitor 75 and the second side of the capacitor is connected to the conductor 68.

The conductor 68 is connected to the secondary coil 76 of a transformer 78 which steps up the voltage that is applied to the primary coil 80. The ratio of the turns of the secondary coil 76 to the turns of the primary coil 80 may be on the order of 40:1. The secondary coil 76 is connected to the electrode 18 by a conductor 82. Thus the pin element 60 is in a circuit in series with the electrode 18 and the secondary coil 76. The circuit has two parallel legs connected to the secondary coil 76, one leg including the first capacitor 66 and the diode 70, the other leg including the second capacitor 75.

A grounded 3000 volt D.C. power supply 84 is connected by a resistor 85 with one side of the switch 62 and also to one side of a grounded capacitor 86. The switch 62 is connected to one end of the primary coil 80 of the transformer 78, the second end of the primary coil being grounded.

With the switch 62 open and with the gap existing between the electrode 18 and the connector pin 60, the three capacitors 66, 75 and 86 are charged by the corresponding voltage sources, the condition of the circuits being static. When the switch 62 is closed to discharge the capacitor 86 through the primary coil 80, the transformer 78 functions in the manner of an automotive spark coil to create a high frequency pulse that establishes an arc across the gap from the electrode 18 to the pin connector 60. The arc provides a conduction path for discharge of the two capacitors 66 and 75, but the diode 70 prevents discharge of the capacitor 66 until the discharge from the capacitor 75 drops below the potential on the capacitor 66. To avoid any possibility of reverse flow from the secondary coil 76 damaging the two capacitors 66 and 75, a 450 volt Zener diode connects the conductor 68 to ground in the manner indicated in FIG. 7. In effect the Zener diode grounds the conductor 68 whenever the voltage of the conductor rises above 450 volts.

FIG. 8 shows graphically the character of the resulting pulse of current as sensed by connecting an oscilloscope to the conductor 82 adjacent the electrode 18. The discharge of the capacitor 86 through the primary coil of the transformer 78 produces the sharp voltage peak 90 which may be of a magnitude ranging between 20,000 and 80,000 volts. When the voltage drops below 400 volts at the point 92 in FIG. 8, the 400 volt D.C. power supply 72 discharges to prolong the pulse and then the variable D.C. voltage supply 64 discharges to form the terminal toe 94 of the pulse.

It is a simple matter to ascertain empirically the dimension of the gap at the electrode and the voltage setting of the supply 64 to form the desired round nose on the end of a connector pin. The adjustment of the voltage supply 64 is determined largely by the mass of metal that is to be melted and the specific heat of the metal.

A further special advantage of the invention is that an electrode made of a suitable metal may be substituted for the carbon electrode 18 to form a plating of the electrode metal on the rounded nose. It has been found, for example, that the use of a gold wire for the electrode results in transfer of gold by the arc to the leading end of the pin connector. If the pin connector is plated with gold prior to the application of the arc, the rounded nose of the leading end of the pin connector is covered with a gold plate which together with the original plating provides uninterrupted gold plating for full protection of the connector pin. The thickness of the gold plating may be varied by varying the diameter of the gold wire. One important advantage of this procedure is that the gold plating added by the arc is fused or metallurgically bonded to the base metal of the conductor pin in an integral manner. In contrast, ordinary gold plating is merely a deposited layer of gold that is not fused to the base metal.

My description in specific detail of the illustrated practice of the invention will suggest various changes, substitutions and other departures from my disclosure within the spirit and scope of the appended claims.

I claim:

1. A method of forming a rounded nose on an end of a pin element, characterized by the steps of:
   placing the pin element in a circuit with an electrode and capacitor means with a fixed gap between the end of the pin element and the electrode;
   charging the capacitor means; and
   applying a pulse of high frequency voltage current across the fixed gap to strike on arc across the gap for discharge of the capacitor means to create heat to melt the end of the pin element sufficiently to form the rounded nose.

2. A method of forming a rounded nose on an end of a pin element, characterized by the steps of:
   placing the pin element in a circuit which includes an electrode and capacitor means with a fixed gap between the end of the pin element and the electrode to hold the circuit open;
   charging the capacitor means; and
   applying an abrupt high voltage pulse of current across the fixed gap to establish a conduction path across the gap to close the circuit to discharge the capacitor means across the gap to create heat to melt the end of the pin element sufficiently to form the rounded nose.

3. A method as set forth in claim 2 in which the metal is copper to produce a hard drawn copper connector pin.

4. A method of fabricating an electrical pin connector, characterized by the steps of: placing a solid metal pin in a circuit with an electrode of precious metal spaced from one end of the pin; and energizing the circuit with a pulse of current to cause an arc to be struck between the electrode and the end of the pin to melt the tip of the pin sufficiently to form a rounded nose thereon of no greater diameter than the pin and simultaneously to transfer precious metal from the electrode to the pin to form a precious metal plating on the rounded nose.

5. A method as set forth in claim 4 in which said electrode is made of gold to deposit gold plating on the rounded nose.

6. A method of forming a rounded nose on an end of a pin element, characterized by the steps of:
   placing the pin element in series with an electrode, the secondary coil of a transformer and capacitor means with a fixed gap between the end of the pin element and the electrode;
   charging the capacitor means; and
   energizing the primary coil of the transformer with current of abruptly changing voltage to create a high voltage pulse in the secondary coil to strike an arc across the fixed gap to cause the capacitor means to be discharged across the arc to create heat to melt the end of the pin element sufficiently to form the rounded nose.

7. A method of forming a rounded nose on an end of a pin element, characterized by the steps of:
   placing the pin element in a circuit having two parallel legs connected with an electrode with a fixed gap between the electrode and the end of the pin element,
   one of said legs including a first capacitor means and a diode in series therewith to prevent reverse flow of current from the juncture of the two legs to the first capacitor means, the other of said legs including a second capacitor means;
   charging the first capacitor means with a given voltage;
   charging the second capacitor means with a higher voltage than the given voltage;
   applying an abrupt high voltage pulse of current across the space between the electrode and the pin element to strike an arc between the electrode and the pin element to initiate discharge of the second capacitor means across the arc with subsequent initiation of discharge of the first capacitor means across the arc in response to lowering of the voltage of the current to below the given voltage,
   thereby creating heat to melt the end of the pin element sufficiently to form the rounded nose.

8. A method of forming a rounded nose on an end of a pin element, characterized by the steps of:
   placing the pin element in a circuit in series with an electrode and the secondary coil of a transformer with a fixed gap between the electrode and the pin element, the circuit having two parallel legs connected to the secondary coil,
   one of said legs including a first capacitor means and a diode in series therewith to prevent reverse flow of current from the juncture of the two legs to the first capacitor means, the other of said legs including a second capacitor means;
   charging the first capacitor means with a given voltage;
   charging the second capacitor means with a higher voltage than the given voltage; and
   energizing the primary coil of the transformer with a current of abruptly changing voltage to create a high voltage pulse in the secondary coil of the transformer to strike an arc across the fixed gap between the electrode and the pin element to initiate discharge of the second capacitor means across the arc with subsequent initiation of discharge of the first capacitor means across the arc in response to lowering of the voltage of the current to below the given voltage,
   thereby creating heat to melt the end of the pin element sufficiently to form the rounded nose.

References Cited by the Examiner

UNITED STATES PATENTS

| | | | |
|---|---|---|---|
| 2,299,747 | 10/1942 | Harter | 219—76 |
| 2,399,466 | 4/1946 | Carlson et al. | 219—68 |
| 2,463,342 | 3/1949 | Wiezer | 29—528 |
| 2,639,754 | 5/1953 | Macy | 153—1 |
| 2,669,640 | 2/1954 | Outcalt et al. | 219—76 |
| 2,680,710 | 6/1954 | Kenmore et al. | 29—528 XR |
| 2,853,593 | 9/1958 | Albrecht | 219—113 |
| 2,885,777 | 5/1959 | Gliss | 29—528 |
| 2,918,719 | 12/1959 | Armstrong | 29—155.55 XR |
| 2,921,618 | 1/1960 | Fuller | 153—1 |
| 3,006,068 | 10/1961 | Anderson et al. | 29—155.55 XR |
| 3,028,478 | 4/1962 | Belopitov | 219—76 |

FOREIGN PATENTS 46,356  11/1916  Sweden.

OTHER REFERENCES

Modern Science Dictionary, 1959 edition, Franklin Pub. Co. Inc., Palisade, N.J., page 507.

WHITMORE A. WILTZ, *Primary Examiner.*

JOHN F. CAMPBELL, *Examiner.*